United States Patent
Adderly et al.

(10) Patent No.: US 9,628,415 B2
(45) Date of Patent: Apr. 18, 2017

(54) DESTINATION-CONFIGURED TOPIC INFORMATION UPDATES

(71) Applicant: International Business Machines Corporation, Armonk, NY (US)

(72) Inventors: Darryl M. Adderly, Morrisville, NC (US); Prasad M. Kashyap, Apex, NC (US); Brian J. Murray, Raleigh, NC (US); Wenjian Qiao, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 14/591,863

(22) Filed: Jan. 7, 2015

(65) Prior Publication Data

US 2016/0195402 A1 Jul. 7, 2016

(51) Int. Cl.
*G01C 21/34* (2006.01)
*H04L 12/58* (2006.01)

(52) U.S. Cl.
CPC .............. *H04L 51/04* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 5,648,768 A | 7/1997 | Bouve | |
| 7,904,064 B2 | 3/2011 | Frank et al. | |
| 2002/0156570 A1* | 10/2002 | Ohtsuji | G01C 21/3608 701/443 |
| 2005/0102099 A1* | 5/2005 | Linn | G01C 21/36 701/411 |
| 2005/0144011 A1* | 6/2005 | Kawana | G10L 15/22 704/277 |
| 2005/0171685 A1* | 8/2005 | Leung | G01C 21/3644 701/532 |
| 2006/0286988 A1 | 12/2006 | Blume et al. | |
| 2007/0138347 A1* | 6/2007 | Ehlers | G01C 21/3461 246/1 R |
| 2007/0293189 A1* | 12/2007 | Shiroishi | G01C 21/3608 455/404.2 |
| 2009/0005961 A1* | 1/2009 | Grabowski | G01C 21/365 701/532 |

(Continued)

OTHER PUBLICATIONS

Author Unknown, Personal Navigation System for Public Transportation, IP Disclosure: IPCOM000194531D, Mar. 29, 2010, pp. 1-3, IP.com, Published online at: http://ip.com/IPCOM/000194531.

(Continued)

*Primary Examiner* — Truc M Do
(74) *Attorney, Agent, or Firm* — Lee Law, PLLC; Christopher B. Lee (57) ABSTRACT

A target travel destination is configured with a topic of conversation planned by a user to occur with at least one person at the target travel destination. A selection by the user of the target travel destination is detected within a user interface. Updated information about the topic of conversation configured with the target travel destination is obtained. The updated information about the topic of conversation configured with the target travel destination is provided to the user during the user's travel to the target travel destination.

18 Claims, 4 Drawing Sheets

(56) References Cited

U.S. PATENT DOCUMENTS

| | | | |
|---|---|---|---|
| 2009/0006194 A1 | 1/2009 | Sridharan et al. | |
| 2009/0150156 A1* | 6/2009 | Kennewick | G06Q 30/0261 704/257 |
| 2009/0271200 A1* | 10/2009 | Mishra | G10L 15/30 704/254 |
| 2010/0274476 A1* | 10/2010 | Kojima | G01C 21/3664 701/533 |
| 2010/0280749 A1* | 11/2010 | Furumoto | G01C 21/3629 701/533 |
| 2012/0059579 A1* | 3/2012 | Pierfelice | G10L 15/26 701/427 |
| 2012/0173245 A1* | 7/2012 | Miyahara | G01C 21/3617 704/275 |
| 2013/0030694 A1 | 1/2013 | Nortrup | |
| 2013/0322634 A1* | 12/2013 | Bennett | G10L 21/00 381/17 |
| 2013/0322665 A1* | 12/2013 | Bennett | G08G 1/096855 381/300 |
| 2014/0082092 A1* | 3/2014 | Adderly | H04M 1/274516 709/206 |
| 2014/0136109 A1* | 5/2014 | Sumiyoshi | G01C 21/3664 701/539 |
| 2014/0164352 A1* | 6/2014 | Denninghoff | H03H 9/02622 707/711 |

OTHER PUBLICATIONS

Author Unknown, Dynamic Buffer and Cache Based on Route Planning, IP Disclosure: IPCOM000204546D, Mar. 2, 2011, pp. 1-3, IP.com, Published online at: http://ip.com/IPCOM/000204546.

Author Unknown, Services: Destination Information, Webpage/site, Printed from website on Dec. 18, 2014, p. 1, StarAlliance.com, Published online at: http://www.staralliance.com/en/services/destination-information/.

* cited by examiner

DESTINATION-CONFIGURED TOPIC INFORMATION UPDATES

BACKGROUND

The present invention relates to identification of relevant information for a social interaction. More particularly, the present invention relates to destination-configured topic information updates.

Users of computing devices may perform web searches to search for information on different topics. The users review the search result links to identify search results that may be of interest. The users then navigate to one or more of the search result links to access and read information published at the links.

BRIEF SUMMARY

A method includes configuring, by a processor, a target travel destination with a topic of conversation planned by a user to occur with at least one person at the target travel destination; detecting, within a user interface, a selection of the target travel destination by the user; obtaining updated information about the topic of conversation configured with the target travel destination; and providing the updated information about the topic of conversation configured with the target travel destination to the user during the user's travel to the target travel destination.

A system includes a user interface; and a processor programmed to: configure a target travel destination with a topic of conversation planned by a user to occur with at least one person at the target travel destination; detect, within the user interface, a selection of the target travel destination by the user; obtain updated information about the topic of conversation configured with the target travel destination; and provide the updated information about the topic of conversation configured with the target travel destination to the user during the user's travel to the target travel destination.

A computer program product includes a computer readable storage medium having computer readable program code embodied therewith, where the computer readable storage medium is not a transitory signal per se, and where the computer readable program code when executed on a computer causes the computer to: configure a target travel destination with a topic of conversation planned by a user to occur with at least one person at the target travel destination; detect, within a user interface, a selection of the target travel destination by the user; obtain updated information about the topic of conversation configured with the target travel destination; and provide the updated information about the topic of conversation configured with the target travel destination to the user during the user's travel to the target travel destination.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides destination-configured topic information updates. The present technology solves a recognized information access problem by providing technology that creates destination-configured topics by associating one or more topics of conversation that are planned by a user to occur with at least one person at a target location/destination with the actual target location/destination itself. The present technology provides computational processing to automatically retrieve up-to-date information about the destination-configured topics while a user is in transit to the destination. Where there was no previous way to programmatically retrieve topic related information for a user while the user is in transit, by use of the present technology, a user may be provided with relevant, up-to-date information about a recurring topic of discussion at a location while in transit to that location. In association with recurring visits to the same location, the present technology may provide users with the latest up-to-date information on the same destination-configured topic since the last time the user visited the respective location (i.e., the information provided to the user is scoped to the most recent information). The users may define locations and types of information to receive based upon those defined locations. The present technology provides automated tracking of information changes/updates between visits.

A destination may be identified as a target destination along with a time frame for visiting the target destination and a previous time of a last visit by the user to the destination (or the last date of information retrieval about the configured topic). Up-to-date destination topic-related information that is associated with the time frame may be presented to the user. The up-to-date destination topic-related information reflects information updates since the last visit to the target destination.

The present technology may be implemented as a client-server system, or otherwise as appropriate for a given implementation. A client application that runs on a portable device and/or that is integrated into a vehicle (e.g., in conjunction with a vehicle navigation system) may process destination topic-related information updates and provide those updates to the user. The client application allows the user to configure destinations and discussion topics that apply to the destinations. As such, the user may add, remove, and edit destinations and the associated discussion topics for each destination. Information may be streamed from the server to the client application and provided to the user in a format appropriate for the current travel conditions.

Regarding delivery of information updates to the user, for a vehicle-based implementation, the user's vehicle may announce and/or display information relevant to the topic(s) of conversation configured for the respective destination. The user's vehicle may track the last time the user visited the destination and may highlight information that has changed since the user last visited the location. The user/driver may listen to the content of the text information updates, for example, via text-to-speech output, and may listen to audio of audio and/or video content updates (and may watch video content of information updates while not driving). The present technology may operate as a hands-free platform within a vehicle to allow delivery of information updates without driver distraction.

Topic-related information may be provided by a dedicated service provider (e.g., satellite radio provider, etc.). A subscription to this service may either be advertisement free with a subscription fee or advertisement supported and fee free.

The present technology may also be utilized to provide information updates related to events that occur at a destination (e.g., new events, changes in events, etc.). As one example, where a destination is a movie theater and the user has previously used the present technology to learn what movies are playing and the respective show times and trailer information, the present technology may provide movie updates (new or changed events) to the user while in transit to the theater since the last time the user went to see a movie. As such, the latest movies, show times, and trailer information since the last time the user went to the theater may be provided to the user, while filtering out and omitting information previously provided to the user. In this manner, contemporaneous information updates relevant to new events at a destination may be provided to the user without providing information that has previously been provided to the user.

A time-sensitive event information option may be configured to filter event information at a destination based upon a current time a user is requesting information updates. Continuing with the movie example, if the time-sensitive event information option is enabled, then only the movie times that occur in time after the time the driver is en route to the theater may be provided. As such, in addition to filtering information related to events at a destination over time, the present technology may be used to perform contemporaneous filtering of event information.

It should be noted that conception of the present subject matter resulted from recognition of certain limitations associated with information gathering for social interactions. For example, it was observed that when people gather, conversations often revolve around certain topics of conversation that are of interest to the respective participants. Because different people have different interests, different groups of people at different locations generally discuss different topics. Based upon these observations, it was determined that, because certain people are often repeatedly seen at the same places and similar topics of conversation may recur at these locations, topics of conversation may be associated with the locations/destinations themselves. For purposes of example, the discussion at one friend's house may revolve around the latest business news, the discussion at another friend's house may revolve around the latest technology devices (e.g., gadgets), and the discussion at a different friend's house may revolve around the latest news in college sports. Similarly, if people meet at a shopping mall to play board games and discuss politics, the people may be interested in obtaining the latest political news prior to gathering, rather than obtaining information about the shopping mall. It was further determined that automated information updates on the topics of conversation associated with the destinations would be desirable because this new technology would allow users to better contribute to the conversations at the respective destinations. It was further determined that new technology to provide the automated destination-configured topic information updates may be integrated into devices transported within or integrated into vehicles so that users may be provided with contemporaneous and relevant information updates while in transit to a destination. Because a user may select a destination prior to beginning to travel, the user may safely travel while being automatically provided with the latest news on the topic(s) associated with the destination without having to manipulate controls while traveling. The present subject matter improves social interaction information gathering by providing for destination-configured topic information updates, as described above and in more detail below. As such, improved information gathering and filtering based upon topics associated with destinations may be obtained through use of the present technology.

The destination-configured topic information updates described herein may be performed in real time to allow prompt information gathering and filtering based upon topics associated with destinations. For purposes of the present description, real time shall include any time frame of sufficiently short duration as to provide reasonable response time for information processing acceptable to a user of the subject matter described. Additionally, the term "real time" shall include what is commonly termed "near real time"— generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
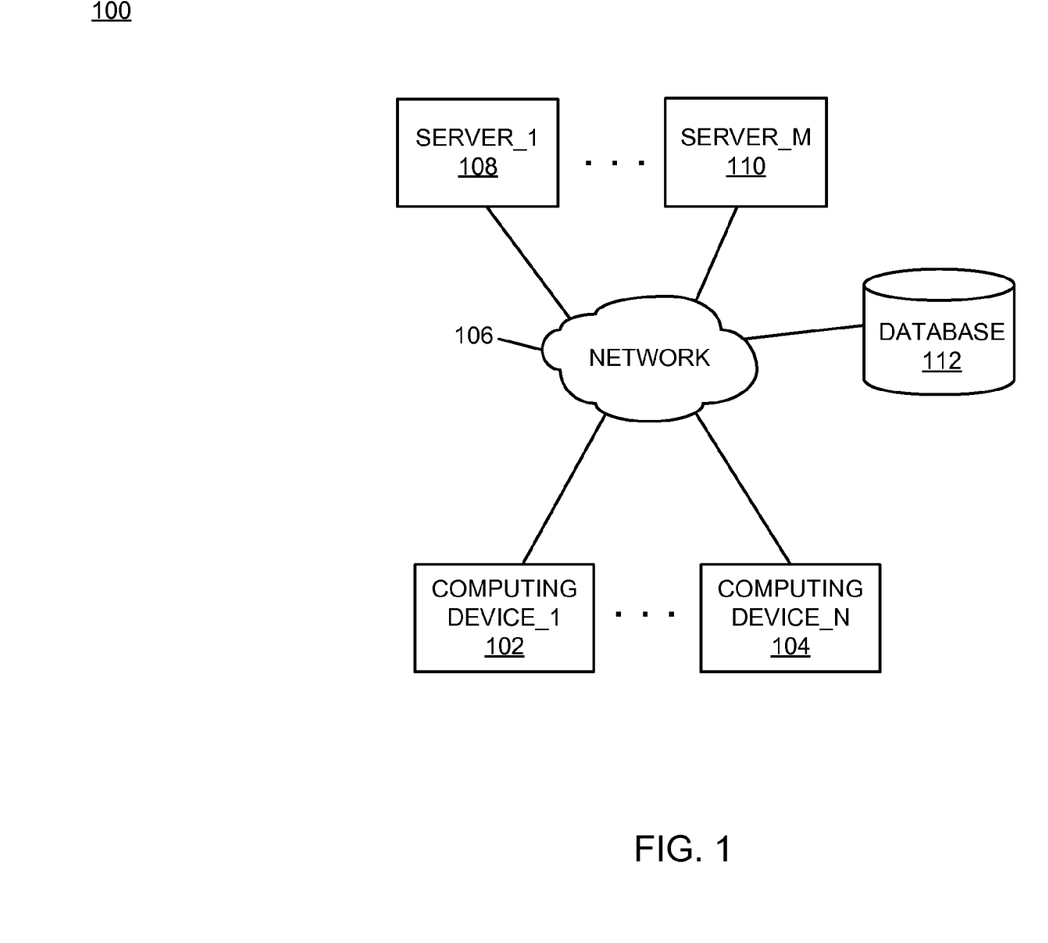
FIG. 1 is a block diagram of an example of an implementation of a system for destination-configured topic information updates according to an embodiment of the present subject matter.

FIG. 1 is a block diagram of an example of an implementation of a system 100 for destination-configured topic information updates. A computing device_1 102 through a computing device_N 104 communicate via a network 106 with several other devices. The other devices include a server_1 108 through a server_M 110. A database 112 provides information, such as news, events, and other information within the system 100.

As will be described in more detail below in association with FIG. 2 through FIG. 4, the computing device_1 102 through the computing device_N 104 and the server_1 108 through the server_M 110 may each provide automated destination-configured topic information updates. The automated destination-configured topic information updates are based upon identification of a destination and configured topic(s) that have been assigned to and configured for the destination, with retrieval of contemporaneous topic-related information while a user is in transit to the destination. The present technology may be implemented at a user computing device or server device level. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 2:
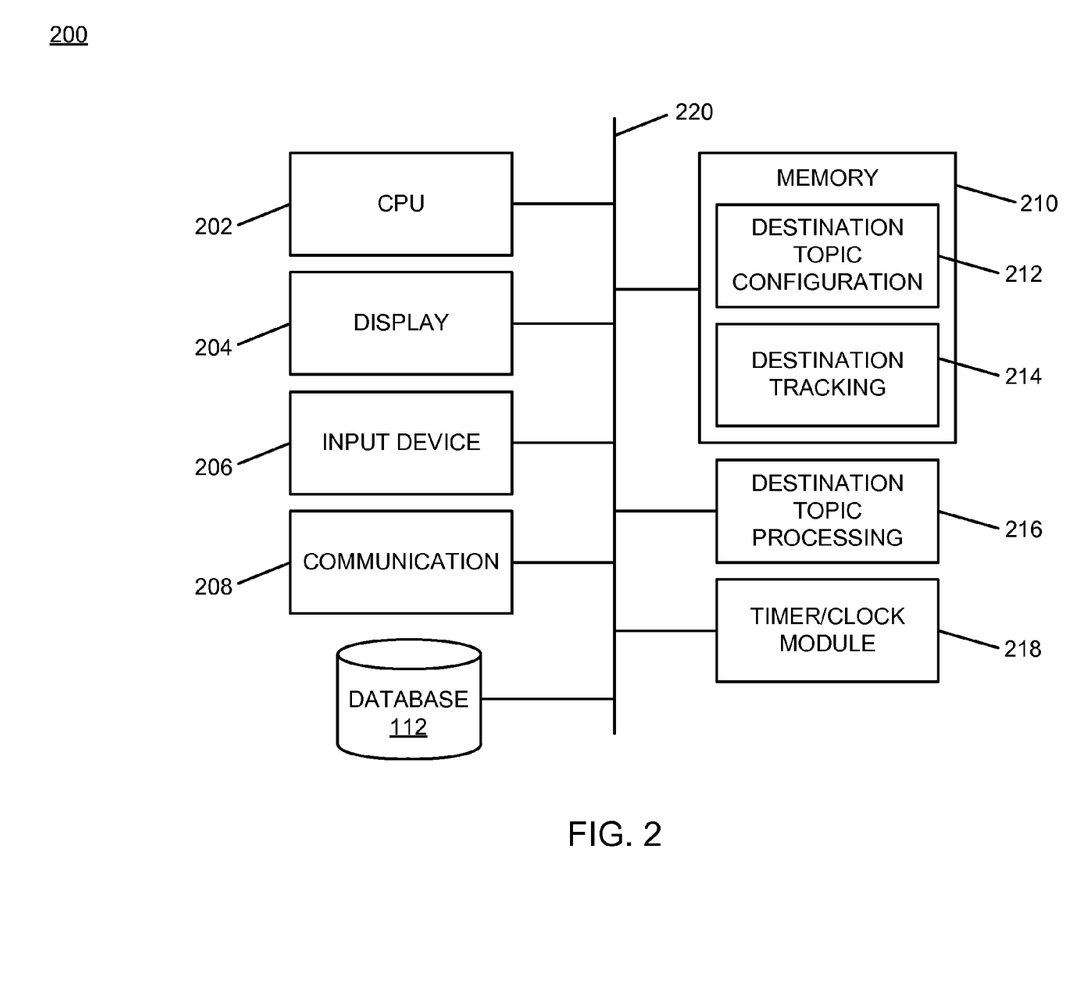
FIG. 2 is a block diagram of an example of an implementation of a core processing module capable of performing destination-configured topic information updates according to an embodiment of the present subject matter.

FIG. 2 is a block diagram of an example of an implementation of a core processing module 200 capable of performing destination-configured topic information updates. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of destination-configured topic information updates in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a destination topic configuration storage area 212 that stores user-configured destinations and topics assigned to and configured for the destinations within the core processing module 200. A destination tracking storage area 214 stores destinations that have been visited over time and times/dates of visits to the respective destinations to allow filtering of relevant information on a topic since a last visit to a particular destination.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A destination topic processing module 216 is also illustrated. The destination topic processing module 216 provides destination topic configuration and topic information processing (e.g., retrieval, filtering, etc.) for the core processing module 200, as described above and in more detail below. The destination topic processing module 216 may perform destination topic configuration (e.g., using the destination topic configuration storage area 212), destination visit tracking over time (e.g., using the destination tracking storage area 214), destination topic-based information retrieval in association with a user visit to a configured destination, time-based filtering of the destination topic-based information, text-to-speech conversion of printed information, and other destination topic-based information processing operations. The destination topic processing module 216 implements the automated destination-configured topic information updates of the core processing module 200.

It should also be noted that the destination topic processing module 216 may form a portion of other circuitry described without departure from the scope of the present subject matter. Further, the destination topic processing module 216 may alternatively be implemented as an application stored within the memory 210. In such an implementation, the destination topic processing module 216 may include instructions executed by the CPU 202 for performing the functionality described herein. The CPU 202 may execute these instructions to provide the processing capabilities described above and in more detail below for the core processing module 200. The destination topic processing module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, as described above and in more detail below. As such, the destination topic processing module 216 may utilize information derived from the timer/clock module 218 for information processing activities, such as for date/time-based retrieval of information, information comparisons over time with respect to a destination (e.g., for different visits), and other processing to perform the destination-configured topic information updates described herein.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the destination topic processing module 216, the timer/clock 218, and the database 112 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
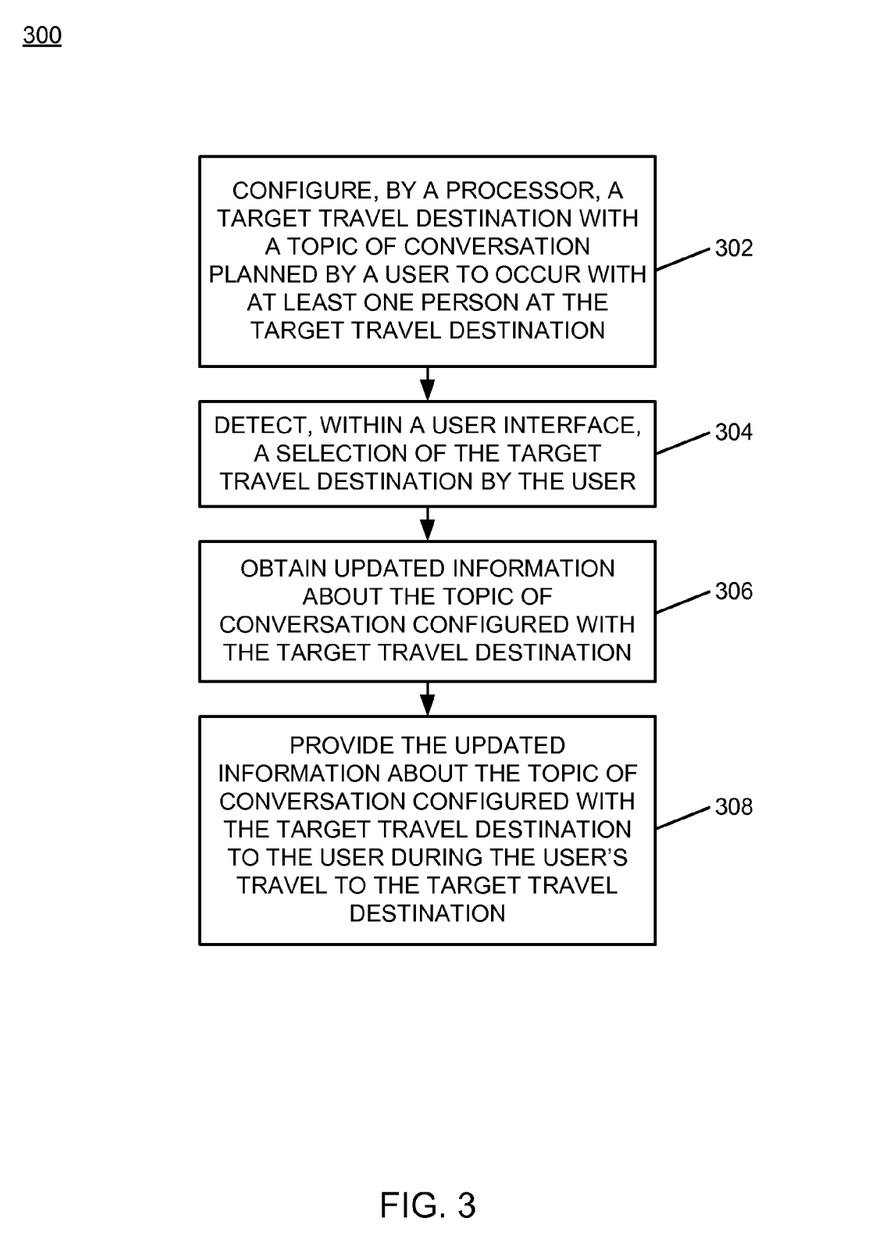
FIG. 3 is a flow chart of an example of an implementation of a process for destination-configured topic information updates according to an embodiment of the present subject matter.
Figure 4:
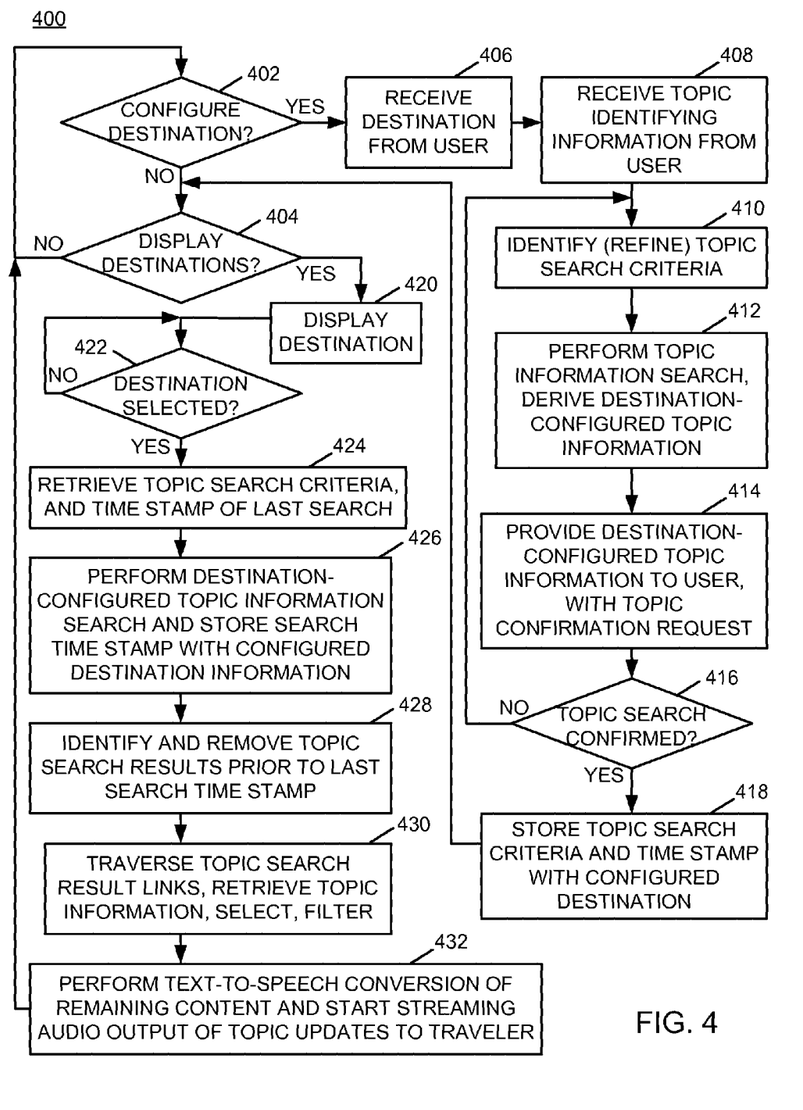
FIG. 4 is a flow chart of an example of an implementation of a process for destination-configured topic information updates that includes processing to configure topics with destinations and to provide up-to-date information to a user while the user is traveling to a destination according to an embodiment of the present subject matter.

FIG. 3 through FIG. 4 described below represent example processes that may be executed by devices, such as the core processing module 200, to perform the automated destination-configured topic information updates associated with the present subject matter. Many other variations on the example processes are possible and all are considered within the scope of the present subject matter. The example processes may be performed by modules, such as the destination topic processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for destination-configured topic information updates. At block 302, the process 300 configures, by a processor, a target travel destination with a topic of conversation planned by a user to occur with at least one person at the target travel destination. At block 304, the process 300 detects, within a user interface, a selection of the target travel destination by the user. At block 306, the process 300 obtains updated information about the topic of conversation configured with the target travel destination. At block 308, the process 300 provides the updated information about the topic of conversation configured with the target travel destination to the user during the user's travel to the target travel destination.

FIG. 4 is a flow chart of an example of an implementation of a process 400 for destination-configured topic information updates that includes processing to configure topics with destinations and to provide up-to-date information to a user while the user is traveling to a destination. The initial description of the processing within the process 400 is of a higher-level iteration, with subsequent description of processing in response to affirmative determinations at the respective higher-level decision points. As such, at decision point 402, the process 400 makes a determination as to whether a request to configure a destination with a topic for information retrieval has been detected. A request to configure a destination with a topic for information retrieval may be detected, for example, responsive to starting a vehicle, displaying a list of destinations and topics, and determining that a traveler's desired destination or desired topic associated with a destination is not within the displayed list. The process 400 may programmatically invoke configuration of a new destination and/or topic for a previously configured destination. Alternatively, a request to configure a destination with a topic for information retrieval may be detected responsive to user input of a request to configure a destination at a time different from a start of travel to a destination.

Continuing with the higher-level iterative processing of the process 400, in response to determining at decision point 402 that a request to configure a destination with a topic for information retrieval has not been detected, the process 400 makes a determination at decision point 404 as to whether to display existing configured topic-related destinations for selection by a traveler within a user interface. Again, this processing may be performed responsive to a user starting a vehicle where the process 400 is performed by a destination topic processing module 216 integrated into the vehicle where the display may be a user interface of the vehicle. Alternatively, this processing may be performed responsive to a user request where the process 400 is performed by a destination topic processing module 216 integrated into a mobile device used by a traveler within the vehicle. In response to determining not to display existing configured topic-related destinations for selection by a traveler at decision point 404, the process 400 returns to decision point 402 and iterates as described above.

Returning to the description of decision point 402, in response to determining that a request to configure a destination with a topic for information retrieval has been detected, the process 400 receives a destination from a user at block 406. The destination may be a target destination of currently-planned travel, or a target destination of future travel planned by the user. At block 408, the process 400 receives topic identifying information from the user to be configured with the target destination. The received topic identifying information may include one or more keywords, sentences, or other topic identifier(s) that specify the user's preference for naming the topic.

At block 410, the process 400 identifies destination-configured topic information search criteria (or refines topic search criteria for subsequent iterations as described in more detail below). The destination-configured topic information search criteria may include one or more terms derived from the received topic identifying information that may be used for searching, selection of search results, and filtering of search results.

At block 412, the process 400 performs a destination-configured topic information search using the derived destination-configured topic information search criteria, and derives destination-configured topic information. Derivation of the destination-configured topic information may include traversing topic search results links, selecting relevant search results, and filtering search results using the derived destination-configured topic information search criteria. Additionally, text-to-speech conversion of the remaining search results may be performed. At block 414, the process 400 provides the destination-configured topic information to the user, such as by use of audio output of text-to-speech converted search results or by rendering video output of video search results (and any associated audio of audio/video search results), along with a topic confirmation request.

At decision point 416, the process 400 makes a determination as to whether the destination-configured topic information is confirmed by the user to be accurate relative to the user's intended type of destination-configured topic information. It should be noted that the intended type of destination-configured topic information may be specified granularly by the user, and the process 400 may iterate as the user refines the intended type of destination-configured topic information. For example, the user may specify a broad topic (e.g., sports), yet really be interested in only local college team news for discussion with fellow alumni at a social gathering. As such, the process 400 may iterate until the correct intended type and granularity of destination-configured topic information is retrieved by the destination-configured topic information search.

In response to determining that the destination-configured topic information is not confirmed by the user to be accurate relative to the user's intended type of destination-configured topic information, the process 400 returns to block 410 to refine the destination-configured topic information search criteria, and iterates as described above until destination-configured topic information derived from the destination-configured topic information search criteria is determined at decision point 416 to be accurate relative to the intended type of destination-configured topic information. As such, the process 400 iteratively refines the programmatically derived destination-configured topic information search criteria for future searches to improve accuracy of the information provided to the user over time.

In response to determining at decision point 416 that the destination-configured topic information is confirmed by the user to be accurate relative to their intended type of destination-configured topic information, the process 400 stores the destination-configured topic information search criteria and a time stamp of the current search with the configured destination at block 418. Because the user has just been provided with the latest available destination-configured topic information and has just confirmed that the information is accurate relative to their intended type of destination-configured topic information, storing the time stamp of the current search may be used in association with future destination-configured topic information searches to filter out information that is posted prior to the current time stamp. As such, only up-to-date information may be retained in the search results and provided to the user in association with travel to a configured destination. The process 400 returns to decision point 404 and iterates as described above.

Returning to the description of decision point 404, in response to determining to display existing configured topic-related destinations for selection by a traveler, the process 400 displays the configured topic-related destinations to the user at block 420. At decision point 422, the process 400 makes a determination as to whether a configured topic-related destination has been selected. In response to determining that a configured topic-related destination has been selected, the process 400 retrieves the stored destination-configured topic information search criteria and a time stamp of the last search at block 424. At block 426, the process 400 performs a destination-configured topic information search using the retrieved destination-configured topic information search criteria to obtain destination-configured topic information search results, and stores a time stamp of the current search with the configured destination information. At block 428, the process 400 identifies destination-configured topic information search results (e.g., within a set of search results) with time stamps that are prior to a time stamp of the last-detected user travel to the target travel destination (or the destination topic configuration time stamp if the process 400 is processing the first detected user travel to the target travel destination), and removes search results that are prior to the last search time stamp. At block 430, the process 400 traverses the topic search results links, and retrieves topic information, selects relevant search results, and filters the search results using the derived destination-configured topic information search criteria.

At block 432, the process 400 performs text-to-speech conversion of the remaining content of the search results. The process 400 translates the text-based destination-configured topic information search results to audio-formatted destination-configured topic information search results using text-to-speech recognition, and starts streaming audio output of audio-formatted topic updates to the traveler. The streaming of the audio output may be performed, for example, using a speaker of a mobile device or speakers of a vehicle within which the user is traveling to the target travel destination. Additionally, as described above, the process 400 may further render video output of video-formatted destination-configured topic information search results (and may output any associated audio of audio/video-formatted destination-configured topic information search results). The process 400 returns to decision point 402 and iterates as described above.

As such, the process 400 allows users to configure travel destinations with topics of interest to the user when traveling to the respective destinations. During travel the user may be programmatically provided with topic information that is configured for the destination of travel. The user may receive the latest available up-to-date information about the topic(s) of interest while traveling to the respective destinations, and as such, may arrive well informed with respect to the topic(s) of likely discussion at the respective destinations.

As described above in association with FIG. 1 through FIG. 4, the example systems and processes provide destination-configured topic information updates. Many other variations and additional activities associated with destination-configured topic information updates are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
    configuring, by a processor, a target travel destination with a topic of conversation planned by a user to occur with at least one person at the target travel destination;
    detecting, within a user interface, a selection of the target travel destination by the user;
    retrieving a search time stamp associated with a time of a last-detected user travel to the target travel destination;
    obtaining updated information about the topic of conversation configured with the target travel destination, where obtaining the updated information about the topic of conversation configured with the target travel destination comprises obtaining information with publication time stamps after the search time stamp associated with the time of the last-detected user travel to the target travel destination; and
    providing the updated information about the topic of conversation configured with the target travel destination to the user during the user's travel to the target travel destination.

2. The method of claim 1, where configuring, by the processor, the target travel destination with the topic of conversation planned by the user to occur with the at least one person at the target travel destination comprises:
    providing the user interface on a display panel of a vehicle that allows user configuration of the target travel destination with the topic of conversation;
    deriving, responsive to receiving topic identifying information from the user via the user interface, destination-configured topic information search criteria based upon the received topic identifying information; and
    confirming with the user accuracy of destination-configured topic information retrieved responsive to a destination-configured topic information search performed using the derived destination-configured topic information search criteria.

3. The method of claim 1, where obtaining the updated information about the topic of conversation configured with the target travel destination comprises:
    retrieving destination-configured topic search criteria associated with the topic of conversation configured with the target travel destination; and
    performing a destination-configured topic information search using the destination-configured topic search criteria.

4. The method of claim 1, where obtaining the information with the publication time stamps after the search time stamp associated with the time of the last-detected user travel to the target travel destination comprises:
    identifying destination-configured topic information search results with time stamps prior to the search time stamp associated with the time of the last-detected user travel to the target travel destination; and
    removing the identified destination-configured topic information search results with the time stamps prior to the search time stamp associated with the time of the last-detected user travel to the target travel destination.

5. The method of claim 1, where providing the updated information about the topic of conversation configured with the target travel destination to the user during the user's travel to the target travel destination comprises:
    translating retrieved text-based destination-configured topic information search results to audio-formatted destination-configured topic information search results using text-to-speech recognition; and
    outputting the audio-formatted destination-configured topic information search results using speakers of a vehicle within which the user is traveling to the target travel destination.

6. The method of claim 1, where the updated information about the topic of conversation comprises audio/video destination-configured topic information search results and where providing the updated information about the topic of conversation configured with the target travel destination to the user during the user's travel to the target travel destination comprises:
    rendering video output of the audio/video destination-configured topic information search results on a display of a vehicle within which the user is traveling to the target travel destination; and
    outputting associated audio of the audio/video destination-configured topic information search results using speakers of the vehicle within which the user is traveling to the target travel destination.

7. A system, comprising:
    a user interface; and
    a processor programmed to:
        configure a target travel destination with a topic of conversation planned by a user to occur with at least one person at the target travel destination;
        detect, within the user interface, a selection of the target travel destination by the user;

retrieve a search time stamp associated with a time of a last-detected user travel to the target travel destination;

obtain updated information about the topic of conversation configured with the target travel destination, where, in being programmed to obtain the updated information about the topic of conversation configured with the target travel destination, the processor is programmed to obtain information with publication time stamps after the search time stamp associated with the time of the last-detected user travel to the target travel destination; and provide the updated information about the topic of conversation configured with the target travel destination to the user during the user's travel to the target travel destination.

8. The system of claim 7, where, in being programmed to configure the target travel destination with the topic of conversation planned by the user to occur with the at least one person at the target travel destination, the processor is programmed to:

provide the user interface on a display panel of a vehicle that allows user configuration of the target travel destination with the topic of conversation;

derive, responsive to receiving topic identifying information from the user via the user interface, destination-configured topic information search criteria based upon the received topic identifying information; and confirm with the user accuracy of destination-configured topic information retrieved responsive to a destination-configured topic information search performed using the derived destination-configured topic information search criteria.

9. The system of claim 7, where, in being programmed to obtain the updated information about the topic of conversation configured with the target travel destination, the processor is programmed to:

retrieve destination-configured topic search criteria associated with the topic of conversation configured with the target travel destination; and perform a destination-configured topic information search using the destination-configured topic search criteria.

10. The system of claim 7, where, in being programmed to obtain the information with the publication time stamps after the search time stamp associated with the time of the last-detected user travel to the target travel destination, the processor is programmed to:

identify destination-configured topic information search results with time stamps prior to the search time stamp associated with the time of the last-detected user travel to the target travel destination; and remove the identified destination-configured topic information search results with the time stamps prior to the search time stamp associated with the time of the last-detected user travel to the target travel destination.

11. The system of claim 7, where, in being programmed to provide the updated information about the topic of conversation configured with the target travel destination to the user during the user's travel to the target travel destination, the processor is programmed to:

translate retrieved text-based destination-configured topic information search results to audio-formatted destination-configured topic information search results using text-to-speech recognition; and output the audio-formatted destination-configured topic information search results using speakers of a vehicle within which the user is traveling to the target travel destination.

12. A computer program product, comprising:

a non-transitory computer readable storage medium having computer readable program code embodied therewith, where the computer readable storage medium is not a transitory signal per se, and where the computer readable program code when executed on a computer causes the computer to:

configure a target travel destination with a topic of conversation planned by a user to occur with at least one person at the target travel destination;

detect, within a user interface, a selection of the target travel destination by the user;

retrieve a search time stamp associated with a time of a last-detected user travel to the target travel destination;

obtain updated information about the topic of conversation configured with the target travel destination, where, in causing the computer to obtain the updated information about the topic of conversation configured with the target travel destination, the computer readable program code when executed on the computer causes the computer to obtain information with publication time stamps after the search time stamp associated with the time of the last-detected user travel to the target travel destination; and provide the updated information about the topic of conversation configured with the target travel destination to the user during the user's travel to the target travel destination.

13. The computer program product of claim 12, where, in causing the computer to configure the target travel destination with the topic of conversation planned by the user to occur with the at least one person at the target travel destination, the computer readable program code when executed on the computer causes the computer to:

provide the user interface on a display panel of a vehicle that allows user configuration of the target travel destination with the topic of conversation;

derive, responsive to receiving topic identifying information from the user via the user interface, destination-configured topic information search criteria based upon the received topic identifying information; and confirm with the user accuracy of destination-configured topic information retrieved responsive to a destination-configured topic information search performed using the derived destination-configured topic information search criteria.

14. The computer program product of claim 12, where, in causing the computer to obtain the updated information about the topic of conversation configured with the target travel destination, the computer readable program code when executed on the computer causes the computer to:

retrieve destination-configured topic search criteria associated with the topic of conversation configured with the target travel destination; and perform a destination-configured topic information search using the destination-configured topic search criteria.

15. The computer program product of claim 12, where, in causing the computer to obtain the information with the publication time stamps after the search time stamp associated with the time of the last-detected user travel to the target travel destination, the computer readable program code when executed on the computer causes the computer to:

identify destination-configured topic information search results with time stamps prior to the search time stamp associated with the time of the last-detected user travel to the target travel destination; and remove the identified destination-configured topic information search results with the time stamps prior to the search time stamp associated with the time of the last-detected user travel to the target travel destination.

16. The computer program product of claim 12, where, in causing the computer to provide the updated information about the topic of conversation configured with the target travel destination to the user during the user's travel to the target travel destination, the computer readable program code when executed on the computer causes the computer to:

translate retrieved text-based destination-configured topic information search results to audio-formatted destination-configured topic information search results using text-to-speech recognition; and output the audio-formatted destination-configured topic information search results using speakers of a vehicle within which the user is traveling to the target travel destination.

17. The computer program product of claim 12, where the updated information about the topic of conversation comprises audio/video destination-configured topic information search results and where, in causing the computer to provide the updated information about the topic of conversation configured with the target travel destination to the user during the user's travel to the target travel destination, the computer readable program code when executed on the computer causes the computer to:

render video output of the audio/video destination-configured topic information search results on a display of a vehicle within which the user is traveling to the target travel destination; and output associated audio of the audio/video destination-configured topic information search results using speakers of the vehicle within which the user is traveling to the target travel destination.

18. The system of claim 7, where the updated information about the topic of conversation comprises audio/video destination-configured topic information search results and where, in being programmed to provide the updated information about the topic of conversation configured with the target travel destination to the user during the user's travel to the target travel destination, the processor is programmed to:

render video output of the audio/video destination-configured topic information search results on a display of a vehicle within which the user is traveling to the target travel destination; and output associated audio of the audio/video destination-configured topic information search results using speakers of the vehicle within which the user is traveling to the target travel destination.

* * * * *